(12) United States Patent
Trajkovic et al.

(10) Patent No.: US 7,027,618 B2
(45) Date of Patent: Apr. 11, 2006

(54) HEAD MOTION ESTIMATION FROM FOUR FEATURE POINTS

(75) Inventors: Miroslav Trajkovic, Ossining, NY (US); Vasanth Philomin, Briarcliff Manor, NY (US); Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 777 days.

(21) Appl. No.: 09/966,410

(22) Filed: Sep. 28, 2001

(65) Prior Publication Data

US 2003/0063777 A1    Apr. 3, 2003

(51) Int. Cl.
    *G06K 9/00*    (2006.01)
(52) U.S. Cl. .................... 382/107; 348/154; 73/488
(58) Field of Classification Search ................ 382/100, 382/103, 107; 73/488; 348/154, 155; 356/27
See application file for complete search history.

(56) References Cited

U.S. PATENT DOCUMENTS

| 5,771,306 A * | 6/1998 | Stork et al. ................. 382/100 |
| 6,272,231 B1 * | 8/2001 | Maurer et al. .............. 382/103 |
| 6,580,810 B1 * | 6/2003 | Yang et al. ................. 382/103 |
| 2002/0102010 A1 * | 8/2002 | Liu et al. .................... 382/107 |

OTHER PUBLICATIONS

Liu et al. ("Robust Head Motion Computation by Taking Advantage of Physical Properties," Proc. Workshop On Human Motion, Dec. 2000, pp. 73-77).*
Chen et al. ("Head pose estimation using both color and feature information," Pattern Recognition, 2000. Proceedings. 15th International conference On Sep. 3-7, 2000, Los Alamitos, CA, USA, IEEE Comput. SOC. US, Sep. 3, 2000, pp. 842-845).*
Colmenarez A.J., et al., "Maximum Likelihood Face Detection", Proceedings of the Second International Conference on Automatic Face and Gesture Recognition, Oct. 14-16, 1996.

(Continued)

*Primary Examiner*—Samir Ahmed
*Assistant Examiner*—Anand Bhatnagar
(74) *Attorney, Agent, or Firm*—Larry Liberchuk

(57) ABSTRACT

Linear method for performing head motion estimation from facial feature data, the method comprising the steps of: obtaining first facial image and detecting a head in the first image; detecting position of four points P of said first facial image where $P=\{p_1, p_2, p_3, p_4\}$, and $p_k=(x_k, y_k)$; obtaining second facial image and detecting a head in the second image; detecting position of four points P' of the second facial image where $P'=\{p'_1, p'_2, p'_3, p'_4\}$ and $p'_k=(x'_k, y'_k)$; and, determining the motion of the head represented by a rotation matrix R and translation vector T using the points P and P'.

The head motion estimation is governed according to an equation:

$$P'_i = RP_i + T,$$

where $$R = \begin{bmatrix} r_1^T \\ r_2^T \\ r_3^T \end{bmatrix} = [r_{ij}]_{3\times 3}$$

and $T=[T_1\ T_2\ T_3]^T$ represents camera rotation and translation respectively.

25 Claims, 1 Drawing Sheet

OTHER PUBLICATIONS

Gutta S., et al., "Mixture of Experts for Classification of Gender, Ethnic Origin, and Pose of Human Faces", IEEE Transactions of Neural Networks, vol. 11, No. 4, Jul. 2000.

Bishop C.M., "Neural Networks for Pattern Recognition", pp. 179-182.

Kittler J., et al., "Combining Classifiers", Proceedings of the ICPR, vol. II, Track B, 1996.

Liu et al: "Robust Head Motion Computation by Taking Advantage of Physical Properties" Proc. Workshop On Human Motion, Dec. 2000, pp. 73-77.

Chen et al: "Head pose estimation using both color and feature information" Pattern Recognition, 2000. Proceedings. 15th International conference On Sep. 3-7, 2000, Los Alamitos, CA, USA, IEEE Comput. SOC. US, Sep. 3, 2000, pp. 842-845.

* cited by examiner

HEAD MOTION ESTIMATION FROM FOUR FEATURE POINTS

BACKGROUND OF THE INVENTION

1. Field of the Invention

The present invention relates to systems and methods for computing head motion estimation from the facial image positions, e.g., eye and mouth corners, and, particularly, to a linear method for performing head motion estimation using four (4) facial feature points. As a special case, an algorithm for head pose estimation from four feature points is additionally described.

2. Discussion of the Prior Art

Head pose recognition is an important research area in human computer interaction and many approaches of head pose recognition have been proposed. Most of these approaches model a face with certain facial features. For example, most existing approaches utilize six facial feature points including pupils, nostrils and lip corners are used to model a face, while others, such as reported in the reference to Z. Liu and Z. Zhang entitled "Robust Head Motion Computation by Taking Advantage of Physical Properties", *Proc. Workshop on Human Motion*, pp. 73–80, Austin, December 2000, implements five facial feature points including eye and mouth corners and the tip of the nose. In Zhang, the head motion is estimated from the five feature points through non-linear optimization. In fact, existing algorithms for face pose estimation are non-linear.

It would be highly desirable to provide a face pose estimation algorithm that is linear, and computationally less demanding than non-linear solutions.

It would be further highly desirable to provide a face pose estimation algorithm that is linear, and relies on only four feature points such as the eye and mouth corners.

SUMMARY OF THE INVENTION

Accordingly, it is an object of the present invention to provide a head motion estimation algorithm that is a linear solution.

It is a further object of the present invention to provide a head motion estimation algorithm that is linear and utilizes four facial feature points.

It is another object of the present invention to provide a head pose estimation algorithm which relies on a head motion estimation algorithm.

In accordance with the principles of the invention, there is provided a linear method for performing head motion estimation from facial feature data, the method comprising the steps of: obtaining first facial image and detecting a head in the first image; detecting position of four points P of said first facial image where $P=\{p_1, p_2, p_3, p_4\}$, and $p_k=(x_k, y_k)$; obtaining a second facial image and detecting a head in the second image; detecting position of four points P' of the second facial image where $P'=\{p'_1, p'_2, p'_3, p'_4\}$ and $p'_k=(x'_k, y'_k)$; and, determining the motion of the head represented by a rotation matrix R and translation vector T using the points P and P'. The head motion estimated is governed according to an equation:

$$P'_i = RP_i + T, \text{ where}$$

$$R = \begin{bmatrix} r_1^T \\ r_2^T \\ r_3^T \end{bmatrix} = [r_{ij}]_{3\times 3}$$

and $T=[T_1\ T_2\ T_3]^T$ represents camera rotation and translation respectively, the head pose estimation being a specific instance of head motion estimation.

Advantageously, the head pose estimation algorithm from four feature points may be utilized for avatar control applications, video chatting and face recognition applications.

BRIEF DESCRIPTION OF THE DRAWINGS

Details of the invention disclosed herein shall be described below, with the aid of the figure listed below, in which.

DETAILED DESCRIPTION OF THE PREFERRED EMBODIMENTS

In accordance with the principles of the invention, a linear method for the computation of head motion estimation from the image positions of eye and mouth corners, is provided. More particularly, a method is provided for estimating head motion from four point matches, with head pose estimation being a special case, when a frontal view image is used as a reference position.

The method is superior to other existing methods, which require either more point matches (at least 7) or, are non-linear requiring at least 5 facial feature matches.

Generally, the method for head motion estimation is as follows: The first step is to acquire a first image $I_1$ and detecting the head in $I_1$. Then, there are detected points P corresponding to the outer corners of eyes and mouth in $I_1$, i.e., $P=\{p_1, p_2, p_3, p_4\}$ where $p_k=(x_k, y_k)$ denotes image coordinates of a point. Then, a second image $I_2$ is acquired with the head detected in $I_2$. Then, there are detected points P' corresponding the eyes and mouth and their outer corners in $I_2$, i.e., $P'=\{p'_1, p'_2, p'_3, p'_4\}$, where $p'_k=(x'_k, y'_k))$ From P and P', the next step involves determining the motion of the head represented by a rotation matrix R and translation vector T. It is understood that once motion parameters R and T are computed, the 3-D structure of all point matches may be computed. However, structure and translation may be determined only up to a scale, so if the magnitude of T is fixed, then the structure is uniquely determined. If the depth of one point in 3D is fixed, then T will be uniquely determined.

As mentioned, the algorithm for head pose estimation is a special case of the head motion estimation algorithm and there are two ways in which this may be accomplished: 1) interactive, which requires a reference image; and, 2) approximate, which uses a generic (average biometric) head geometry information, also referred to as a Generic Head Model (GHM).

For the Interactive algorithm, the following steps are implemented: 1) Before using the system, a user is asked to face the camera in a predefined reference position. The reference eye and mouth corners $P_0$ are acquired as described in the steps above. 2) When a new image is acquired, eye and mouth corners are detected and head motion estimated as in the remaining steps indicated in the algorithm above. 3) The head rotation matrix corresponds to head pose matrix.

Figure 1:
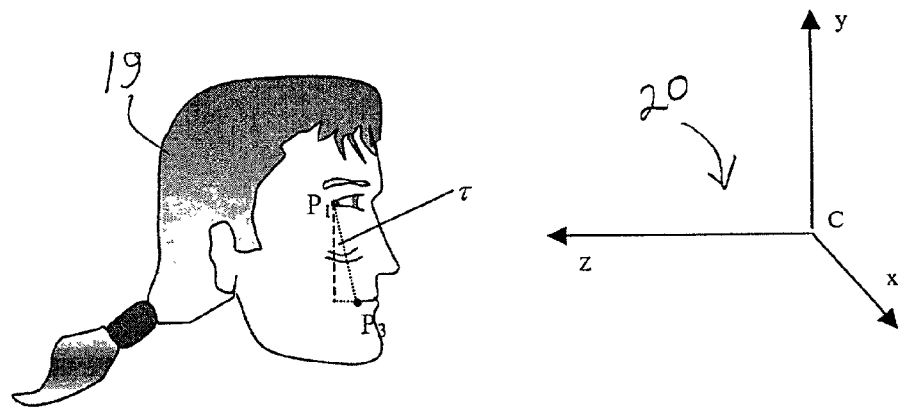
FIG. 1 depicts the configuration of typical feature points for a typical head.

The Approximate algorithm requires no interaction with the user, but assumes certain biometric information is available and fixed for all the users. For example, as shown in FIG. 1, there is depicted the approximate algorithm including the configuration of typical feature points for a typical head 19 in relation to a camera coordinate system 20 denoted as system $C_{xyz}$. In FIG. 1, the points $P_1$ and $P_3$ represent the eye and mouth corners, respectively of the generic head model 19. It is understood that for the frontal view, shown in FIG. 1, these points $P_1$ and $P_3$ have different depths ($Z_1$ and $Z_3$, respectively). An assumption is made that the angle τ is known, and an average value is used over all possible human heads. This is not an exact value, but pitch (tilt) angle is very difficult to compute precisely, since even the same person, when asked to look straight into camera, may tilt head differently in repeated experiments. For the fixed angle τ, head pose may be uniquely determined from only one image of the head as will be explained in greater detail hereinbelow.

For purposes of description, it is assumed that a camera or digital image capture device has acquired two images of a model head at different positions. Let points $p_1$, $p_2$, $p_3$ and $p_4$ denote the image coordinates of eye (points $p_1$, $p_2$) and mouth corners (points $p_3$ and $p_4$) in a first image and let $p'_1$, $p'_2$, $p'_3$, $p'_4$ denote the corresponding eye and mouth corner coordinates in a second image. Given these feature coordinates, the task is to determine head motion (represented by rotation and translation) between those first and second two images.

Generally, the algorithm is performed in the following steps: 1) using facial constraints, compute the three-dimensional (3-D) coordinates for the feature points from both images; and, 2) given the 3-D positions of the feature points, compute the motion parameters (rotation R and translation T matrices).

Figure 2:
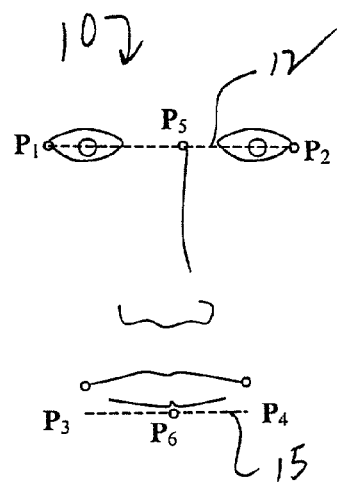
FIG. 2 depicts the face geometry 10 providing the basis of the head pose estimation algorithm of the present invention.

The step of computing the 3-D coordinates of feature points according to the algorithm are now described. As shown in the face geometry 10 depicted in FIG. 2, features at points $P_1$, $P_2$, $P_3$, $P_4$ and $p'_1$, $p'_2$, $p'_3$, $p'_4$ denote the 3-D coordinates of the respective eye and mouth corners in the first two images. From the face geometry, shown in FIG. 2, the following properties are assumed: 1) the line segment 12 connecting points $P_1P_2$ is parallel to the line segment 15 connecting points $P_3P_4$, i.e., $P_1P_2 \| P_3P_4$; 2) the line segment 12 connecting points $P_1P_2$ is orthogonal to a line segment connecting points $P_5P_6$ (where $P_5$ and $P_6$ are midpoints of segments $P_1P_2$ and $P_3P_4$, respectively). Numerically, these properties 1 and 2 may be written according to respective equations (1) and (2) as follows:

$$\frac{X_2 - X_1}{X_4 - X_3} = \frac{Y_2 - Y_1}{Y_4 - Y_3} = \frac{Z_2 - Z_1}{Z_4 - Z_3} \tag{1}$$

$$((P_1+P_2)-(P_3+P_4))\cdot(P_2-P_1)=0 \tag{2}$$

where $P_i=[X_i\ Y_i\ Z_i]^T$ denotes a 3D coordinates of an image point $p_i$. The relation between image and the three-dimensional (3-D) coordinates of an arbitrary point $P_k$ is given by a well-known perspective equation as follows:

$$x_k = \frac{X_k}{Z_k},\ y_k = \frac{Y_k}{Z_k} \tag{3}$$

Since it is well known that the structure recovery from monocular image sequences may be performed only up to a scale, one of the Z coordinates is fixed, and the other coordinates are computed in reference to this one. Hence, to simplify the computation, and without a loss of generality, it is assumed that $Z_1=1$. By cross-multiplying equation (1) and substituting (3) into (1), the following relations set forth in equations (4) and (5) result:

$$Z_3[(x_1-x_3)-Z_2(x_2-x_3)]-Z_4[(x_1-x_4)-Z_2(x_2-x_4)]=0 \tag{4}$$

$$Z_3[(y_1-y_3)-Z_2(y_2-y_3)]-Z_4[(y_1-y_4)-Z_2(y_1-x_4)]=0 \tag{5}$$

When equations (4) and (5) are set forth in matrix form, equation (6) results:

$$\begin{bmatrix} (x_1 - x_3) - Z_2(x_2 - x_3) & -(x_1 - x_4) + Z_2(x_2 - x_4) \\ (y_1 - y_3) - Z_2(y_2 - y_3) & -(y_1 - y_4) + Z_2(y_2 - y_4) \end{bmatrix} \begin{bmatrix} Z_3 \\ Z_4 \end{bmatrix} = \begin{bmatrix} 0 \\ 0 \end{bmatrix} \tag{6}$$

This equation will have non-trivial solutions in $Z_3$ and $Z_4$ if and only if the determinant in equation (7) is equal to zero, i.e., $$\det\left(\begin{bmatrix} (x_1 - x_3) - Z_2(x_2 - x_3) & -(x_1 - x_4) + Z_2(x_2 - x_4) \\ (y_1 - y_3) - Z_2(y_2 - y_3) & -(y_1 - y_4) + Z_2(y_2 - y_4) \end{bmatrix}\right) = 0 \tag{7}$$

Equivalently, equation (7) may be set forth as equation (8) as follows:

$$-Z_2^2\det\left(\begin{bmatrix} (x_2-x_3) & (x_2-x_4) \\ (y_2-y_3) & (y_2-y_4) \end{bmatrix}\right) + \det\left(\begin{bmatrix} (x_1-x_3) & -(x_1-x_4) \\ (y_1-y_3) & -(y_1-y_4) \end{bmatrix}\right) - Z_2\left(\det\left(\begin{bmatrix} (x_2-x_3) & (x_1-x_4) \\ (y_2-y_3) & (y_1-y_4) \end{bmatrix}\right) + \det\left(\begin{bmatrix} (x_1-x_3) & (x_2-x_4) \\ (y_1-y_3) & (y_2-y_4) \end{bmatrix}\right)\right) = 0 \tag{8}$$

Equation (8) is a second order polynomial and it has two solutions. It is easy to verify (e.g., by substitution in (7)) that there is one trivial solution, $Z_2=1$, and the second solution is found as:

$$Z_2 = \frac{\det\left(\begin{bmatrix} (x_1-x_3) & (x_1-x_4) \\ (y_1-y_3) & (y_1-y_4) \end{bmatrix}\right)}{\det\left(\begin{bmatrix} (x_2-x_3) & (x_2-x_4) \\ (y_2-y_3) & (y_2-y_4) \end{bmatrix}\right)}. \tag{9}$$

By substituting $Z_2$ into any of equations (4) and (5) one linear equation in $Z_3$ and $Z_4$ is obtained. Another equation is obtained by substituting (3) into (2) and it is of the form:

$$Z_3p_{h3}^T(P_1-P_2)+Z_4p_{h4}^T(P_1-P_2)=\|P_1\|^2-\|P_2\|^2. \tag{10}$$

where $p_{hi}=[x_i\ y_i\ 1]^T$. $Z_3$ and $Z_4$ may now be solved from equations (10) and (4)

As known, the motion of head points can be expressed according to equation (11) as:

$$P'_i = RP_i + T \quad (11)$$

where $$R = \begin{bmatrix} r_1^T \\ r_2^T \\ r_3^T \end{bmatrix} = [r_{ij}]_{3\times 3}$$

and $T=[T_1\ T_2\ T_3]^T$ represent camera rotation and translation respectively. Equation (11) may now be written in terms of R and T as:

$$\begin{bmatrix} P_i^T & 0^T & 0^T & 1 & 0 & 0 \\ 0^T & P_i^T & 0^T & 0 & 1 & 0 \\ 0^T & 0^T & P_i^T & 0 & 0 & 1 \end{bmatrix} \begin{bmatrix} r_1 \\ r_2 \\ r_3 \\ T \end{bmatrix} = P'_i \quad (12)$$

From equation (12) it is observed that each point pair yields 3 equations. As the total number of unknowns is twelve (12), at least four point pairs are necessary to linearly solve for rotation and translation.

It should be understood that the elements of matrix R are not independent (i.e., $RR^T=I$), so once matrix R is solved, it may need to be corrected so that it represents the true rotation matrix. This may be performed by decomposing R using Singular Value Decomposition (SVD) into a form $R=USV^T$, and computing a new rotation matrix according to equation (13) as follows:

$$R = UV^T. \quad (13)$$

As known, a "Head Pose" may be uniquely represented as a set of three angles (yaw, roll and pitch), or, as a rotation matrix R (given that there is a one-to-one correspondence between the rotation matrix and the pose angles). Interactive head pose estimation is equivalent to head motion estimation however, an approximate head pose estimation is described which may be simplified by decomposing it into two steps, as follows: 1) assuming that user has tilted his/her head so that both eye and mouth corners are at the same distance from the camera ($z_1=z_2=z_3=z_4$) and that this is an Auxiliary Reference Position (ARP); 2) compute head pose for the ARP; and, 3) updating a pitch angle, by simply subtracting r from its value in ARP.

The rotation matrix R may be written as follows:

$$R = \begin{bmatrix} r_1^T \\ r_2^T \\ r_3^T \end{bmatrix} = [r_{ij}]_{3\times 3}$$

which satisfies the condition, $RR^T=I$, or equivalently $$r_i^T r_j = \begin{cases} 0, & i \neq j \\ 1, & i = j \end{cases}. \quad (14)$$

Let $F_1, F_2, F_3, F_4$ denote the 3-D coordinates of the eye and mouth corners of the reference, frontal view of the face. Then, accounting for the face geometric constraints and constraint 1) above, there is obtained the relations governed by equations 15) as follows:

$$F_2 - F_1 \propto [1\ 0\ 0]^T$$

$$F_6 - F_5 \propto [0\ 1\ 0]^T \quad (15)$$

where symbol $\propto$ means "equal up to a scale" or proportional. The goal accomplished by the present invention is to find a pose matrix R that maps points $P_k$ to $F_k$, i.e., $$R(P_2 - P_1) \propto [1\ 0\ 0]^T$$

$$R(P_6 - P_5) \propto [0\ 1\ 0]^T \quad (16)$$

In terms of rows of rotation matrix, equation (16) may be written as:

$$r_2^T(P_2 - P_1) = 0$$

$$r_3^T(P_2 - P_1) = 0$$

$$r_1^T(P_6 - P_5) = 0$$

$$r_3^T(P_6 - P_5) = 0 \quad (17)$$

From the second and fourth equation in (17), $r_3$ may be computed as follows:

$$r_3 = (P_6 - P_5) \times (P_2 - P_1). \quad (18)$$

The remaining components of the rotation matrix may be computed from (14) and (17) as:

$$r_2 = r_3 \times (P_2 - P_1)$$

$$r_1 = r_2 \times r_3 \quad (19)$$

From equation (19) it is straightforward to compute yaw, roll and pitch angles. The true pitch angle is then obtained by subtracting $\tau$ from its current value.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A linear method for performing head motion estimation from facial feature data, the method comprising the steps of:
    obtaining a first facial image and detecting a head in said first image;
    detecting position of only four points P of said first facial image where $P = \{p_1, p_2, p_3, p_4\}$, and $p^k = (x_k, y_k)$;
    obtaining a second facial image and detecting a head in said second image;
    detecting position of only four points P' of said second facial image where $P' = \{p'_1, p'_2, p'_3, p'_4\}$ and $p'_k = (x'_k, y'_k)$; and
    determining the motion of the head represented by a rotation matrix R and translation vector T using said points P and P'.

2. The linear method of claim 1, wherein said only four points P of said first facial image and said only four points P' of said second facial image include locations of outer corners of each eye and mouth of each respective first and second facial images.

3. The linear method of claim 1, wherein said head motion estimation is governed according to:

$P'_i = RP_i + T$, where $$R = \begin{bmatrix} r_1^T \\ r_2^T \\ r_3^T \end{bmatrix} = [r_{ij}]_{3\times 3}$$

and $T=[T_1\ T_2\ T_3]^T$ represent camera rotation and translation respectively, said head pose estimation being a specific instance of head motion estimation.

4. A linear method for performing head motion estimation from facial feature data, the method comprising the steps of:
- obtaining a first facial image and detecting a head in said first image;
- detecting position of four points P of said first facial image where $P=\{p_1, p_2, p_3, p_4\}$, and $p_k=(x_k, y_k)$;
- obtaining a second facial image and detecting a head in said second image;
- detecting position of four points P' of said second facial image where $P'=\{p'_1, p'_2, p'_3, p'_4\}$ and $p'_k=[x'_k, y'_k]$); and,
- determining the motion of the head represented by a rotation matrix R and translation vector T using said points P and P',
- wherein said head motion estimation is governed according to:

$P'_i = RP_i + T$, where $$R = \begin{bmatrix} r_1^T \\ r_2^T \\ r_3^T \end{bmatrix} = [r_{ij}]_{3\times 3}$$

and $T=[T_1\ T_2\ T_3]^T$ represent camera rotation and translation respectively, said head pose estimation being a specific instance of head motion estimation, and
wherein said head motion estimation is governed according to said rotation matrix R, said method further comprising the steps of:
determining rotation matrix R that maps points $P_k$ to $F_k$ for characterizing a head pose, said points $F_1, F_2, F_3, F_4$ representing three-dimensional (3-D) coordinates of the respective four points of a reference, frontal view of said facial image, and $P_k$ is the three-dimensional (3-D) coordinates of an arbitrary point where $P_i=[X_i\ Y_i\ Z_i]^T$, said mapping governed according to the relation:

$R(P_2-P_1) \propto [1\ 0\ 0]^T$ $R(P_6-P_5) \propto [0\ 1\ 0]^T$ wherein $P_5$ and $P_6$ are midpoints of respective line segments connecting points $P_1P_2$ and $P_3P_4$ and, line segment connecting points $P_1P_2$ is orthogonal to a line segment connecting points $P_5P_6$, and $\propto$ indicates a proportionality factor.

5. The linear method of claim 4, wherein components r1, r2 and r3 are computed as:

$r^T_2(P_2-P_1)=0$ $r^T_3(P_2-P_1)=0$ $r^T_1(P_6-P_5)=0$ $r^T_3(P_6-P_5)=0$.

6. The linear method of claim 5, wherein components r1, r2 and r3 are computed as:

$r_3=(P_6-P_5)\times(P_2-P_1)$, $r_2=r_3\times(P_2-P_1)$ $r_1=r_3\times r_3$.

7. The linear method of claim 4, wherein $$\begin{bmatrix} P_i^T & 0^T & 0^T & 1 & 0 & 0 \\ 0^T & P_i^T & 0^T & 0 & 1 & 0 \\ 0^T & 0^T & P_i^T & 0 & 0 & 1 \end{bmatrix} \begin{bmatrix} r_1 \\ r_2 \\ r_3 \\ T \end{bmatrix} = P'_i,$$

each point pair yielding 3 equations, whereby at least four point pairs are necessary to linearly solve for said rotation and translation.

8. The linear method of claim 7, further comprising the step of: decomposing said rotation matrix R using Singular Value Decomposition (SVD) to obtain a form $R=USV^r$.

9. The linear method of claim 7, further comprising the step of computing a new rotation matrix according to $R=UV^r$.

10. A linear method for performing head motion estimation from facial feature data, the method comprising the steps of:
- obtaining image position of four points $P_k$ of a facial image;
- determining a rotation matrix R that maps points $P_k$ to $F_k$ for characterizing a head pose, said points $F_1, F_2, F_3, F_4$ representing three-dimensional (3-D) coordinates of the respective four points of a reference, frontal view of said facial image, and $P_k$ is the three-dimensional (3-D) coordinates of an arbitrary point where $P_i=[X_i\ Y_i\ Z_i]^T$, said mapping governed according to the relation:

$R(P_2-P_1) \propto [1\ 0\ 0]^T$ $R(P_6-P_5) \propto [0\ 1\ 0]^T$ wherein $P_5$ and $P_6$ are midpoints of respective line segments connecting points $P_1P_2$ and $P_3P_4$ and, line segment connecting points $P_1P_2$ is orthogonal to a line segment connecting points $P_5P_6$, and $\propto$ indicates a proportionality factor.

11. The linear method of claim 10, wherein components r1, r2 and r3 are computed as:

$r^r_1(P_2-P_1)=0$ $r^r_3(P_2-P_1)=0$ $r^r_1(P_6-P_5)=0$ $r^r_3(P_6-P_5)=0$.

12. The linear method of claim 11, wherein components $r_1$, $r_2$ and $r_3$ are computed as:

$$r_3 = (P_6 - P_5) = (P_2 - P_1)$$

$$r_2 = r_3 \times (P_2 - P_1)$$

$$r_1 = r_2 \times r_3.$$

13. The linear method of claim 12, wherein a motion of head points is represented according to $P'_i = RP_i = T$ where $$R = \begin{bmatrix} r_1^T \\ r_2^T \\ r_3^T \end{bmatrix} = [r_{ij}]_{3 \times 3}$$

represents image rotation, $T = [T_1\ T_2\ T_3]^T$ represents translation, and $P'_i$ denotes a 3-D image position of four points $P_k$ of another facial image.

14. The linear method of claim 13, wherein $$\begin{bmatrix} P_i^T & 0^T & 0^T & 1 & 0 & 0 \\ 0^T & P_i^T & 0^T & 0 & 1 & 0 \\ 0^T & 0^T & P_i^T & 0 & 0 & 1 \end{bmatrix} \begin{bmatrix} r_1 \\ r_2 \\ r_3 \\ T \end{bmatrix} = P'_i,$$

each point pair yielding 3 equations, whereby at least four point pairs are necessary to linearly solve for said rotation and translation.

15. The linear method of claim 14, further comprising the step of: decomposing said rotation matrix R using Singular Value Decomposition (SVD) to obtain a form $R = USV^r$.

16. The linear method of claim 15, further comprising the step of computing a new rotation matrix according to $R = UV^r$.

17. A program storage device readable by machine, tangible embodying a program of instructions executable by the machine to perform method steps for performing head motion estimation from facial feature data, the method comprising the steps of:
 obtaining a first facial image and detecting a head in said first image;
 detecting position of only four points P of said first facial image where $P = \{P_1, P_2, P_3, P_4\}$, and $P_k = (x_k, y_k)$;
 obtaining a second facial image and detecting a head in said second image;
 detecting position of only four points P' of said second facial image where $' = \{p'_1, p'_2, p'_3, p'_4\}$ and $p'_k = (x'_k)$; and,
 determining the motion of the head represented by a rotation matrix R and translation vector T using said points P and P'.

18. The program storage device readable by machine as claimed in claim 17, wherein said only four points P of said first facial image and only four points P' of said second facial image include locations of outer corners of each eye and mouth of each respective first and second facial image.

19. The program storage device readable by machine as claimed in claim 17, wherein said head motion estimation is governed according to:

$$P'_i = RP_i + T, \text{ where}$$

$$R = \begin{bmatrix} r_1^T \\ r_2^T \\ r_3^T \end{bmatrix} = [r_{ij}]_{3 \times 3}$$

and $T = [T_1\ T_2\ T_3]^T$ represent camera rotation and translation respectively, said head pose estimation being a specific instance of head motion estimation.

20. A program storage device readable by machine, tangible embodying a program of instructions executable by the machine to perform method steps for performing head motion estimation from facial feature data, the method comprising the steps of:
 obtaining a first facial image and detecting a head in said first image;
 detecting position of four points P of said first facial image where $P = \{P_1, P_2, P_3, P_4\}$, and $P_k = (x_k, y_k)$;
 obtaining a second facial image and detecting a head in said second image;
 detecting position of four points P' of said second facial image where $P' = \{p'_1, p'_2, p'_3, p'_4\}$ and $p'_k = (x'_k, y')$; and
 determining the motion of the head represented by a rotation matrix R and translation vector T using said points P and P',
 wherein said head motion estimation is governed according to:

$$Pv'_i = RP_i + T, \text{ where}$$

$$R = \begin{bmatrix} r_1^T \\ r_2^T \\ r_3^T \end{bmatrix} = [r_{ij}]_{3 \times 3}$$

and $T = [T_1\ T_2\ T_3]^T$ represent camera rotation and translation respectively, said head pose estimation being a specific instance of head motion estimation, and
 wherein said head pose estimation is governed according to said rotation matrix R, said me:hod further comprising the steps of:
 determining rotation matrix R that maps points $P_k$ to $F_k$ for characterizing a head pose, said points $F_1$, $F_2$, $F_3$, $F_4$ representing three-dimensional (3-D) coordinates of the respective four points of a reference, frontal view of said facial image, and $P_k$ is the three-dimensional (3-D) coordinates of an arbitrary point where $P_i = [X_i\ Y_i\ Z_i]$, said mapping governed according to the relation:

$$R(P_2 - P_1) \propto [1\ 0\ 0]^T$$

$$R(P_6 - P_5) \propto [0\ 1\ 0]^T$$

wherein $P_5$ and $P_6$ are midpoints of respective line segments connecting points $P_1 P_2$ and $P_3 P_4$ and, line segment connecting points $P_1 P_2$ is orthogonal to a line segment connecting points $P_5 P_6$, and $\propto$ indicates a proportionality factor.

21. The program storage device readable by machine as claimed in claim 20, wherein components r1, r2 and r3 are computed as:

$r'_2(P_2-P_1)=0$ $r'_3(P_2-P_1)=0$ $r'_1(P_6-P_5)=0$ $r'_3(P_6-P_5)=0$.

22. The program storage device readable by machine as claimed in claim 20, wherein components r1, r2 and r3 are computed as:

$r_3=(_6-p_5)\times(P_2-P_1)$ $r_2=r_3\times(P_2-P_1)$ $r_1=r_2\times r_3$.

23. The program storage device readable by machine as claimed in claim 20, wherein $$\begin{bmatrix} P_i^T & 0^T & 0^T & 1 & 0 & 0 \\ 0^T & P_i^T & 0^T & 0 & 1 & 0 \\ 0^T & 0^T & P_i^T & 0 & 0 & 1 \end{bmatrix} \begin{bmatrix} r_1 \\ r_2 \\ r_3 \\ T \end{bmatrix} = P'_i,$$

each point pair yielding 3 equations, whereby at least four point pairs are necessary to linearly solve for said rotation and translation.

24. The program storage device readable by machine as claimed in claim 23, further comprising the steps of decomposing said rotation matrix R using Singular Value Decomposition (SVD) to obtain a form $R=USV^r$.

25. The program storage device readable by machine as claimed in claim 23, further comprising the steps of computing a new rotation matrix according to $R=UV^r$.

* * * * *